Figure 1:
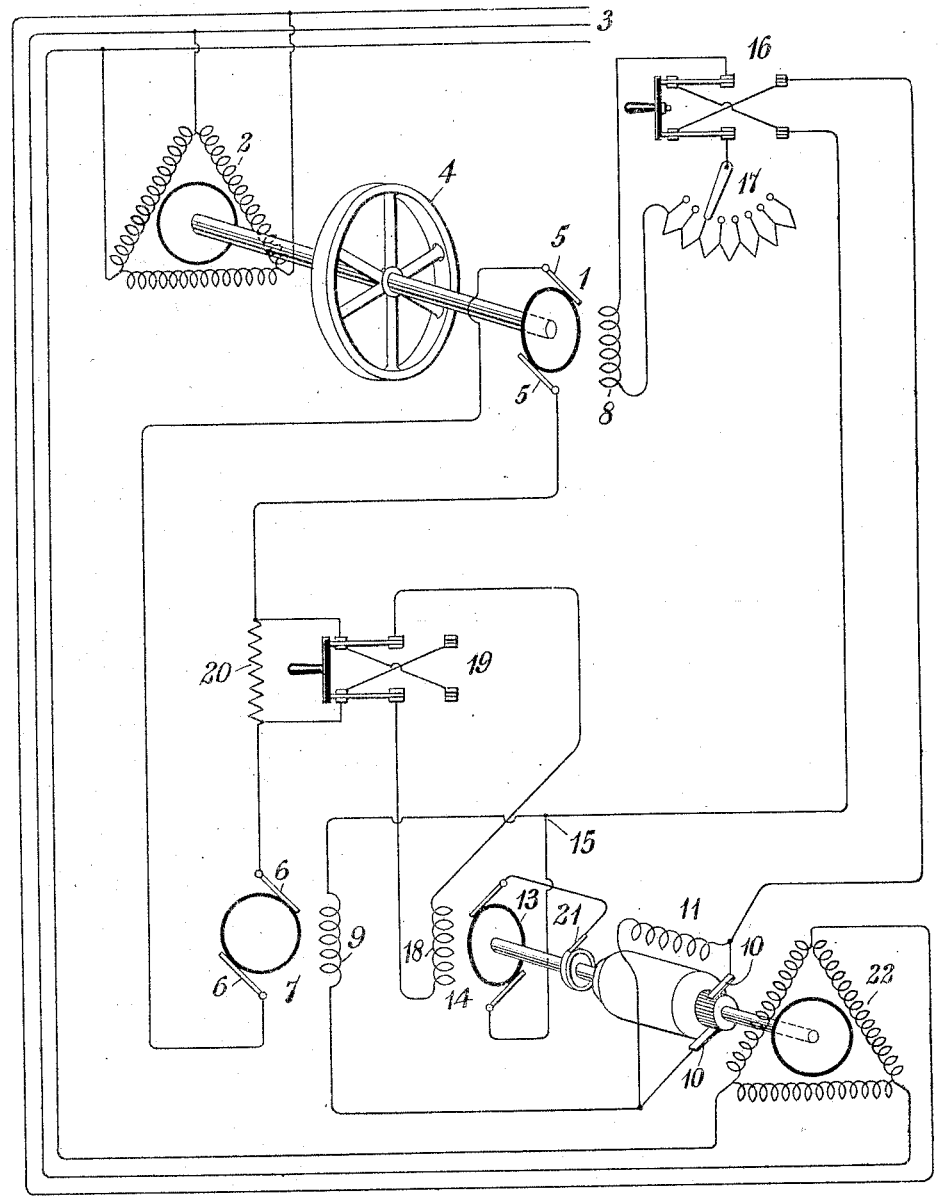

UNITED STATES PATENT OFFICE.

MAX HARTENHEIM, OF HALE, ENGLAND, ASSIGNOR TO WESTINGHOUSE ELECTRIC AND MANUFACTURING COMPANY, A CORPORATION OF PENNSYLVANIA.

CONTROL SYSTEM FOR ELECTRIC MOTORS.

947,329.     Specification of Letters Patent.     Patented Jan. 25, 1910.

Application filed June 7, 1909. Serial No. 500,639.

*To all whom it may concern:*

Be it known that I, MAX HARTENHEIM, a subject of the German Empire, and a resident of Ashleigh, Park Road, Hale, Cheshire, England, have invented a new and useful Improvement in Control Systems for Electric Motors, of which the following is a specification.

This invention relates to control systems for electric motors and particularly to systems in which the speed and direction of rotation of the motor is controlled by varying the field of the generator which supplies it with energy.

In systems of the character above indicated, it is desirable to reduce the excitation of the generator and to increase the excitation of the motor when the load on the motor is increased in order to prevent an abnormal increase in the power given out by the generator.

It has already been proposed to provide an auxiliary exciting circuit in addition to the ordinary exciting circuit of the motor and generator, the windings of which are so arranged on the motor field magnet as to assist the ordinary field magnet windings while on the generator field magnet, the auxiliary windings are so arranged as to oppose the effect of the ordinary field magnet windings. The exciter for the auxiliary field circuit has its field magnet so arranged that the excitation varies in accordance with the current supplied from the main generator to the motor. This arrangement necessitates two separate windings on the field magnets of both generator and motor, and it is the object of my invention to avoid the use of auxiliary windings and also to reduce the size of the additional exciter.

According to my present invention, the field magnet windings of the generator and of the motor are arranged the one on the one side and the other on the side of the neutral wire of a three-wire circuit and the exciting generator is constructed as a three-wire machine, in a well known manner. In the neutral wire of the three-wire circuit, I connect the armature of the additional exciter, the field magnet of which is connected in parallel with a resistance in the main circuit of the generator and motor or is otherwise arranged so that the excitation shall vary with the current in the said circuit. Under these circumstances, it will be readily seen that the voltage of the additional exciter may be arranged to assist the voltage supplied by the exciting generator to the motor field magnet winding and to oppose the voltage supplied by the exciting generator to the main generator field magnet winding and that the excitation of these two machines will vary with the current flowing in the main circuit connecting their armatures, in the manner desired. The additional exciting generator, in this arrangement, I have found may be made of much smaller capacity, for the same fluctuation of motor load, than the additional exciter that is required in connection with the method heretofore proposed.

The invention is illustrated in the accompanying drawings, of which—

Figure 2:
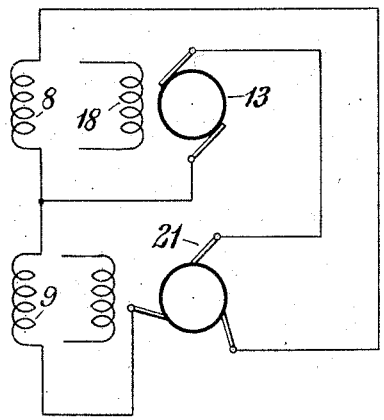
Figure 3:
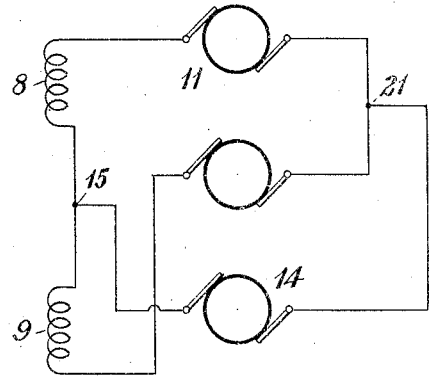
Figure 4:
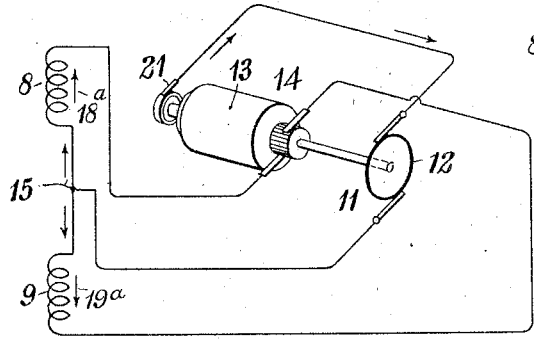
Figure 5:
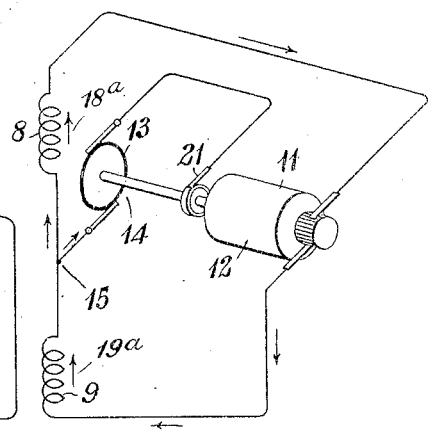

Figure 1 is a diagrammatic view of a control system of the above character embodying the invention; Figs. 2, 3 and 4 are diagrammatic views illustrating modifications of a part of the system of Fig. 1, Fig. 5 showing the same part of the system of Fig. 1 for the purpose of comparison.

Referring now to Fig. 1, a direct current generator 1 is driven by a three-phase induction motor 2 which is connected to a supply circuit 3 and is provided with a fly-wheel 4. The brushes 5 of the generator 1 are connected to the brushes 6 of a direct current motor 7 which operates an intermittent load. The field magnet winding 8 of the generator 1 and the field magnet winding 9 of the motor 7 are connected in series across the brushes 10 of a three-wire exciter 11 which is driven by a motor 22, the third terminal 21 of the exciter 11 being connected in series with the armature 13 of an additional exciter 14 to the junction 15 of the field magnet windings 8 and 9. A reversing switch 16 and a rheostat 17 are also connected in series with the field magnet winding 8. The field magnet winding 18 of the additional exciter 14 is connected, through a reversing switch 19, to the terminals of a resistance 20 which is included in one of the conductors connecting the brushes 5 and 6 of the generator 1 and the motor 7, respectively.

The operation of the system is as follows:—The voltage generated by the additional exciter 14 which is connected in the third wire of the three-wire exciter 11, causes an increase in the current traversing the field magnet winding 9 of the motor 7 and a decrease in the current traversing the field winding 8 of the generator 1 which is proportional to the load on the motor 7, since the excitation of this additional exciter is derived from the terminals of the resistance 20. By means of the reversing switch 16, a reversal of the direction of rotation of the motor 7 may be effected, the rheostat 17 providing a manual adjustment for the excitation of the generator 1. The reversing switch 19 is provided in order that the voltage generated by the additional exciter 14 may always cause an increase in the current traversing the field magnet winding 9 whatever may be the direction of rotation of the motor 7. The reversing switch 19 may, of course, be arranged to be operated by the movement of the lever which operates the reversing switch 16. The third wire 21 of the three-wire exciter 11 may be connected either directly to the middle point of the armature winding of the exciter, as shown in Fig. 1, or it may be connected to an auxiliary set of brushes located in the neutral plane of the machine, as illustrated in Fig. 2.

As a further modification, the three-wire exciter may be provided with two armature windings and two commutators, as shown in Fig. 3, the brushes of different polarity on two commutators being connected together by the third wire. It is also possible to interchange the three-wire exciter and the additional exciter, that is to say, to construct the exciter as an ordinary direct current machine with two brushes and the additional exciter as a three-wire machine, such an arrangement being illustrated in Fig. 4. In this case, the auxiliary machine 14 is connected to the field magnet windings 8 and 9 of the generator and motor, respectively, in such manner that each half of the armature winding 13 of the auxiliary machine is in series with one of these field magnet windings, the armature 12 of the exciter 11 being connected between the junction 15 of the field magnet windings 8 and 9 and the third wire 21 of the auxiliary exciter 14.

The arrangement shown in Fig. 4 has the disadvantage that the auxiliary exciter must be of much greater capacity than with the arrangement shown in Fig. 1, as will be readily understood from a comparison of Figs. 4 and 5, Fig. 5 showing the exciter and the auxiliary exciter connected as shown in Fig. 1. In both Figs. 4 and 5, the current traversing the field magnet winding 8 is indicated by the arrow 18$^a$ and the current traversing the field magnet winding 9 by the arrow 19$^a$. By reference to Fig. 5, it will be seen that the armature 13 of the auxiliary exciter 14 need only be of sufficient capacity to carry the difference between the currents 19 and 18. In the arrangement shown in Fig. 4, however, the armature 13 of the auxiliary exciter 14 must be of sufficient capacity to carry the sum of the currents 18 and 19, since both of these currents pass through the auxiliary exciter on their way to the exciter 14.

I claim as my invention:

1. In a motor-control system, the combination with a generator and a motor having their armatures electrically connected together in series and their field magnet windings similarly connected together, of two auxiliary generators one of which is included in said field magnet circuit and is provided with a balancing conductor which is connected through the other to a point in the field magnet circuit which is located between the two windings.

2. In a motor-control system, the combination with a generator and a motor having their armature windings and their field magnet windings connected together in separate circuits, of two auxiliary generators mechanically coupled together, one of which is included in said field magnet circuit and is provided with a balancing conductor which is connected, through the other generator, to a point in the field magnet circuit which is located between the two windings.

3. The combination with a main circuit, a main motor operatively connected to said circuit, a main generator driven by said motor and a controlled motor having its armature in series with the armature of said main generator, of series-connected field magnet windings for said main generator and controlled motor, an auxiliary motor operatively connected to the main circuit and two auxiliary generators driven by said auxiliary motor, one of said generators being included in circuit of the field magnet windings of the main generator and the controlled motor and having a balancing conductor which is connected, through the other, to said field magnet winding circuit between the windings.

In testimony whereof, I have hereunto subscribed my name this 14th day of May, 1909.

MAX HARTENHEIM.

Witnesses:
NORMAN H. SHEARD,
JAS. STEWART BROADFOOT.